(12) United States Patent
Burgos et al.

(10) Patent No.: US 9,202,494 B1
(45) Date of Patent: Dec. 1, 2015

(54) SPLIT-RING RESONATOR (SRR) NFT DESIGN FOR USE IN HAMR

(71) Applicant: HGST Netherlands B.V., Amsterdam (NL)

(72) Inventors: Stanley Burgos, Huntington Park, CA (US); Matteo Staffaroni, Pleasanton, CA (US); Barry C. Stipe, San Jose, CA (US)

(73) Assignee: HGST NETHERLAND B.V., Amsterdam (NL)

( * ) Notice: Subject to any disclaimer, the term of this patent is extended or adjusted under 35 U.S.C. 154(b) by 0 days.

(21) Appl. No.: 14/706,686

(22) Filed: May 7, 2015

Related U.S. Application Data (62) Division of application No. 14/339,339, filed on Jul. 23, 2014, now Pat. No. 9,053,722.

(51) Int. Cl.

| | | |
|---|---|---|
| G11B 11/00 | (2006.01) | |
| G11B 5/00 | (2006.01) | |
| G11B 5/48 | (2006.01) | |
| G11B 5/60 | (2006.01) | |
| G11B 5/31 | (2006.01) | |
| G11B 13/08 | (2006.01) | |
| G11B 7/1387 | (2012.01) | |

(52) U.S. Cl.
CPC ............ G11B 5/4866 (2013.01); G11B 5/3133 (2013.01); G11B 5/6088 (2013.01); G11B 13/08 (2013.01); *G11B 7/1387* (2013.01); *G11B 2005/001* (2013.01)

(58) Field of Classification Search
CPC .............. G11B 5/4866; G11B 2005/0021; G11B 5/314; G11B 5/6088; G11B 2005/001; G11B 7/1387; G11B 5/3116; G11B 13/045; G11B 11/10554; G11B 13/08; G11B 5/3133

USPC ........... 369/13.33, 13.13, 13.24, 13.03, 13.02
See application file for complete search history.

(56) References Cited

U.S. PATENT DOCUMENTS

| | | | |
|---|---|---|---|
| 7,272,079 B2 | 9/2007 | Challener | |
| 7,330,404 B2 | 2/2008 | Peng et al. | |
| 8,031,561 B2 | 10/2011 | Hellwig et al. | |
| 8,248,891 B2 | 8/2012 | Lee et al. | |
| 8,451,705 B2 * | 5/2013 | Peng et al. | ............... 369/112.27 |
| 8,514,673 B1 | 8/2013 | Zhao et al. | |

(Continued)

FOREIGN PATENT DOCUMENTS

WO     2013163195 A1     10/2013

OTHER PUBLICATIONS

Matsumoto Takuya; "Highly Efficient Near-Field Optical Transducer for Thermally Assisted Magnetic Recording"; Optronics, 0286-9659; vol.;No. 296;p. 85-89; 2006; Japan.

Pendry; et al. "Magnetism from Conductors and Enhanced Nonlinear Phenomena"; IEEE Transactions on Microwave Theory and Techniques, vol. 47, No. 11, Nov. 1999.

Stipe; et al. "Magnetic Recording at 1.5 Pb m-2 Using an Integrated Plasmonic Antenna"; http://www.nature.com/doifinder/10.1038/nphoton.2010.90; published online May 2010.

(Continued)

*Primary Examiner* — Ali Neyzari
(74) *Attorney, Agent, or Firm* — Patterson & Sheridan, LLP (57) ABSTRACT

An NFT is used in a HAMR magnetic write head. The NFT functions as a resonant circuit when in operation. The resonant circuit, which comprises the NFT, is a split-ring resonator (SRR) that has a capacitive portion and an inductive portion. The inductance and the capacitance results in a very well focused ultra-small spot-size concentrated on the magnetic media. The focus occurs at the capacitive area of the NFT with minimal to no impact upon the write pole of the HAMR magnetic head.

11 Claims, 8 Drawing Sheets

(56) References Cited

U.S. PATENT DOCUMENTS

| | | |
|---|---|---|
| 8,526,275 B1 | 9/2013 | Yuan et al. |
| 8,619,513 B1 | 12/2013 | Challener et al. |
| 8,634,280 B1 | 1/2014 | Wang et al. |
| 8,780,677 B2 | 7/2014 | Zheludev et al. |
| 9,042,209 B2 * | 5/2015 | Balamane et al. ......... 369/13.33 |
| 2013/0064051 A1 | 3/2013 | Peng et al. |

OTHER PUBLICATIONS

Souloulis et al.; "Negative Refractive Index at Optical Wavelengths"; www.sciencemag.org; Science vol. 315; Jan. 2007.

Matsumoto et al.; "Writing 40 nm Marks by Using a Beaked Metallic Plate Near-Field Optical Probe"; Optic Letters; vol. 31, No. 2; Jan. 2006.

Zhou et al. "Magnetic and Electric Excitations in Split Ring Resonators"; Optics Express; vol. 15, No. 26; Dec. 2007.

* cited by examiner

SPLIT-RING RESONATOR (SRR) NFT DESIGN FOR USE IN HAMR

CROSS-REFERENCE TO RELATED APPLICATIONS

This application is a divisional of co-pending U.S. patent application Ser. No. 14/339,339, filed Jul. 23, 2014, which is herein incorporated by reference.

BACKGROUND

1. Field

Embodiments disclosed herein generally relate to data storage systems, and more particularly, to heat-assisted magnetic recording (HAMR) heads.

2. Description of the Related Art

Higher storage bit densities in magnetic media used in disk drives have reduced the size (volume) of magnetic bits to the point where the magnetic bit dimensions are limited by the grain size of the magnetic material. Although the grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering its temperature. However, lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR), which are used interchangeably herein, and can be applied to longitudinal and perpendicular recording systems as well as "bit patterned media". Heating of the media surface has been accomplished by a number of techniques such as focused laser beams or near-field optical sources.

Typically, the HAMR head includes two optical components: a microphotonic spot-size converter (SSC) and a near field transducer (NFT). The SSC converts the highly divergent output of an external semiconductor laser diode into a well-confined mode that couples into the NFT. The NFT is a plasmonic nano-antenna that further focuses the light into an ultra-small spot-size for high-density magnetic recording. However, the ultra-small spot-size is not easily achieved. Oftentimes the ultra-small spot-size is broadly focused such that the write pole of the HAMR head is negatively affected.

Therefore, there is a need in the art for an improvement in HAMR heads.

SUMMARY

Embodiments disclosed herein generally relate to a NFT in a HAMR magnetic write head. The NFT functions as a resonant circuit when in operation. The resonant circuit, which comprises the NFT, is a split-ring resonator (SRR) that has a capacitive portion and an inductive portion. The inductance and the capacitance results in a very well concentrated ultra-small spot-size focused on the magnetic media. The focus occurs at the capacitive area of the NFT with minimal to no impact upon the write pole of the HAMR magnetic head.

In one embodiment, the near field transducer comprises a body having an aperture therethrough, a first end, and a second end, wherein the first end is spaced from the second end to form a capacitance portion, and wherein the body connecting the two ends forms an inductance portion.

In another embodiment, a magnetic recording system comprises a magnetic medium; and magnetic write head having a near field transducer, the near field transducer comprising a body having an aperture therethrough, a first end, and a second end, wherein the first end is spaced from the second end to form a capacitance portion, and wherein the body connecting the two ends forms an inductance portion.

In another embodiment, a hard disk drive comprises one or more disks coupled to a spindle; a slider disposed opposite one or more disks; a magnetic write head coupled to the slider, the magnetic write head including a near field transducer that comprises a body having an aperture therethrough, a first end, and a second end, wherein the first end is spaced from the second end to form a capacitance portion, and wherein the body connecting the two ends forms an inductance portion.

BRIEF DESCRIPTION OF THE DRAWINGS

So that the manner in which the above recited features can be understood in detail, a more particular description of the disclosure, briefly summarized above, may be obtained by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to the specific embodiments described hererin. Instead, any combination of the following features and elements, whether related to different embodiments or not, is contemplated to implement and practice the disclosure. Furthermore, although embodiments disclosed herein may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to a NFT in a HAMR magnetic write head. The NFT functions as a resonant circuit when in operation. The resonant circuit, which comprises the NFT, is a SRR that has a capacitive portion and an inductive portion. The resonant inductance and capacitance of the NFT results in an ultra-small spot-size focused on the magnetic media. The focus occurs at the capacitive area of the NFT, with minimal to no impact upon the write pole of the HAMR magnetic head.

Figure 1A:
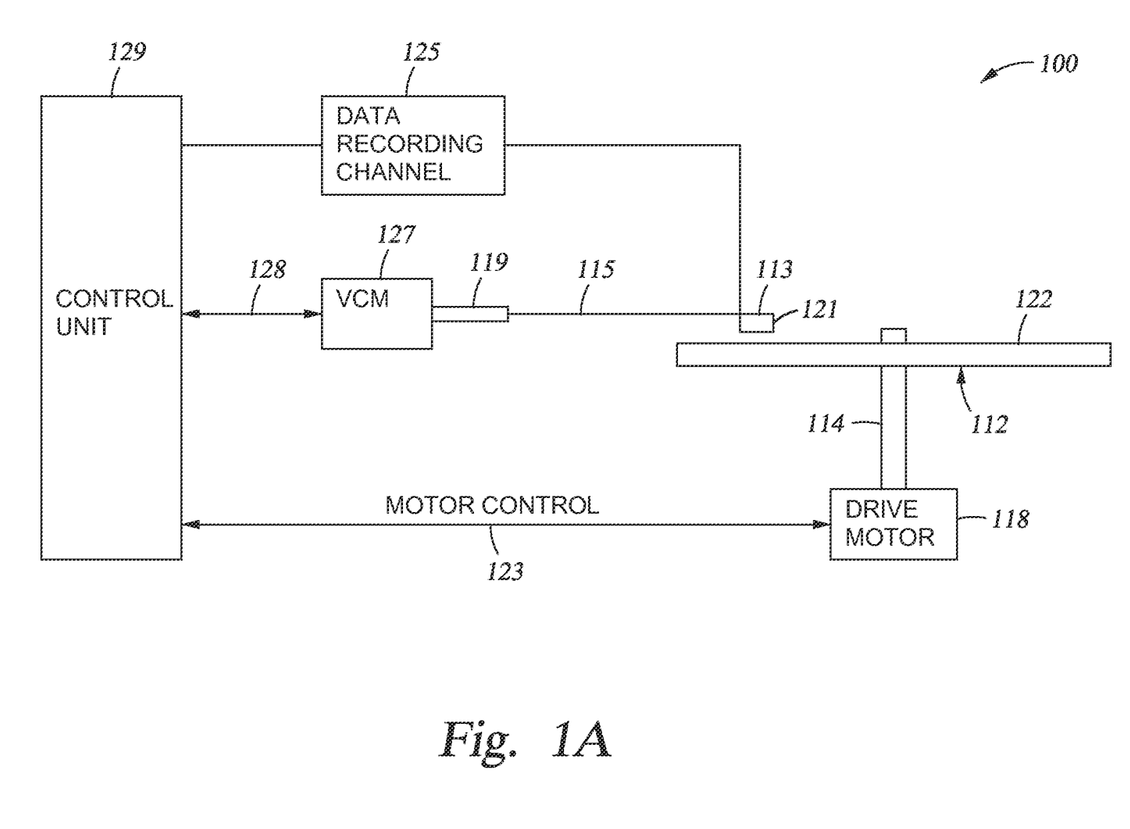
FIGS. 1A-1B illustrate a disk drive system, according to embodiments described herein.

FIG. 1A illustrates a disk drive 100 according to one embodiment disclosed herein. As shown, at least one rotatable magnetic media 112 is supported on a spindle 114 and rotated by a disk drive motor 118. At least one slider 113 is positioned near the magnetic media 112, with each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic media 112 where the desired data are written. Each slider 113 is attached to an actuator arm 119 by way of a suspension 115. The suspension 115 provides a slight spring force, which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, with the direction and speed of the coil movements being controlled by motor current signals supplied by a control unit 129.

During operation of a TAR or HAMR enabled disk drive 100, the rotation of the magnetic media 112 generates an air bearing between the slider 113 and the disk surface 122 which exerts an upward force, or lift, on the slider 113. The air bearing thus counter-balances the slight spring force of the suspension 115 and supports the slider 113 off and slightly above the media surface 122 by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by a control unit 129, such as access control and internal clock signals. Typically, the control unit 129 comprises logic control circuits, storage means, and a microprocessor. The control unit 129 generates control signals to control various system operations such as drive motor control signals on line 123, and head position and seek control signals on line 128. The control signals on line 128 provide the desired current profiles to optimally move and position the slider 113 to the desired data track on the media 112. Write and read signals are communicated to and from the write and read heads on the assembly 121 by way of a data recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
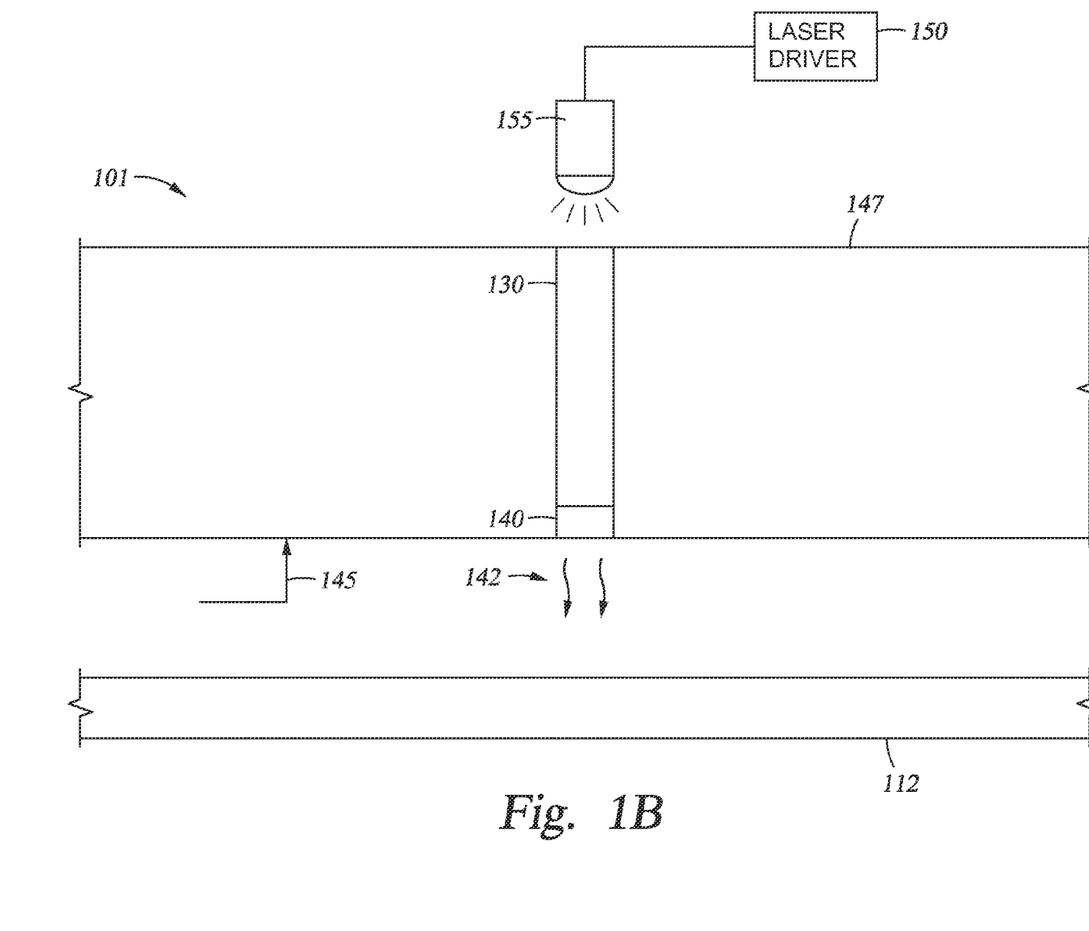

FIG. 1B is a cross-sectional schematic of a HAMR-enabled write head 101, according to one embodiment described herein. The head 101 is operatively attached to a radiation source 155 (i.e., a laser diode) that is powered by a driver 150. The radiation source 155 may be placed directly on the head 101 or it may be located separate from the slider 113 (shown in FIG. 1A) and delivered through an optical fiber or waveguide. Similarly, the driver 150 circuitry may be located on the slider 113, or on a system-on-chip (SOC) associated with the disk drive 100, such as the control unit 129 shown in FIG. 1A. The head 101 includes a media-facing surface (MFS) 145, such as an air-bearing surface (ABS), that is facing a magnetic media 112, and a surface 147 that is opposite the MFS 145. The head 101 further includes a SSC 130 for focusing the radiation, such as a laser beam, transmitted by the radiation source 155 into the NFT 140. In some embodiments, a waveguide (not shown) may be disposed between the SSC 130 and the NFT 140. The head 101 may include one or more lenses (not shown) for focusing the beam spot of the radiation before the emitted radiation reaches the SSC 130. The NFT 140 may be located at or near the MFS 145, such as at the air-bearing surface (ABS). The NFT 140 further focuses the beam spot to avoid heating neighboring tracks of data on the magnetic media 112—i.e., creates a beam spot much smaller than the diffraction limit. As shown by arrows 142, this optical energy emits from the NFT 140 to the surface of the magnetic media 112 below the MFS 145 of the head 101. The embodiments herein, however, are not limited to any particular type of radiation transmitted from the radiation source 155 to the MFS 145.

Figure 2:
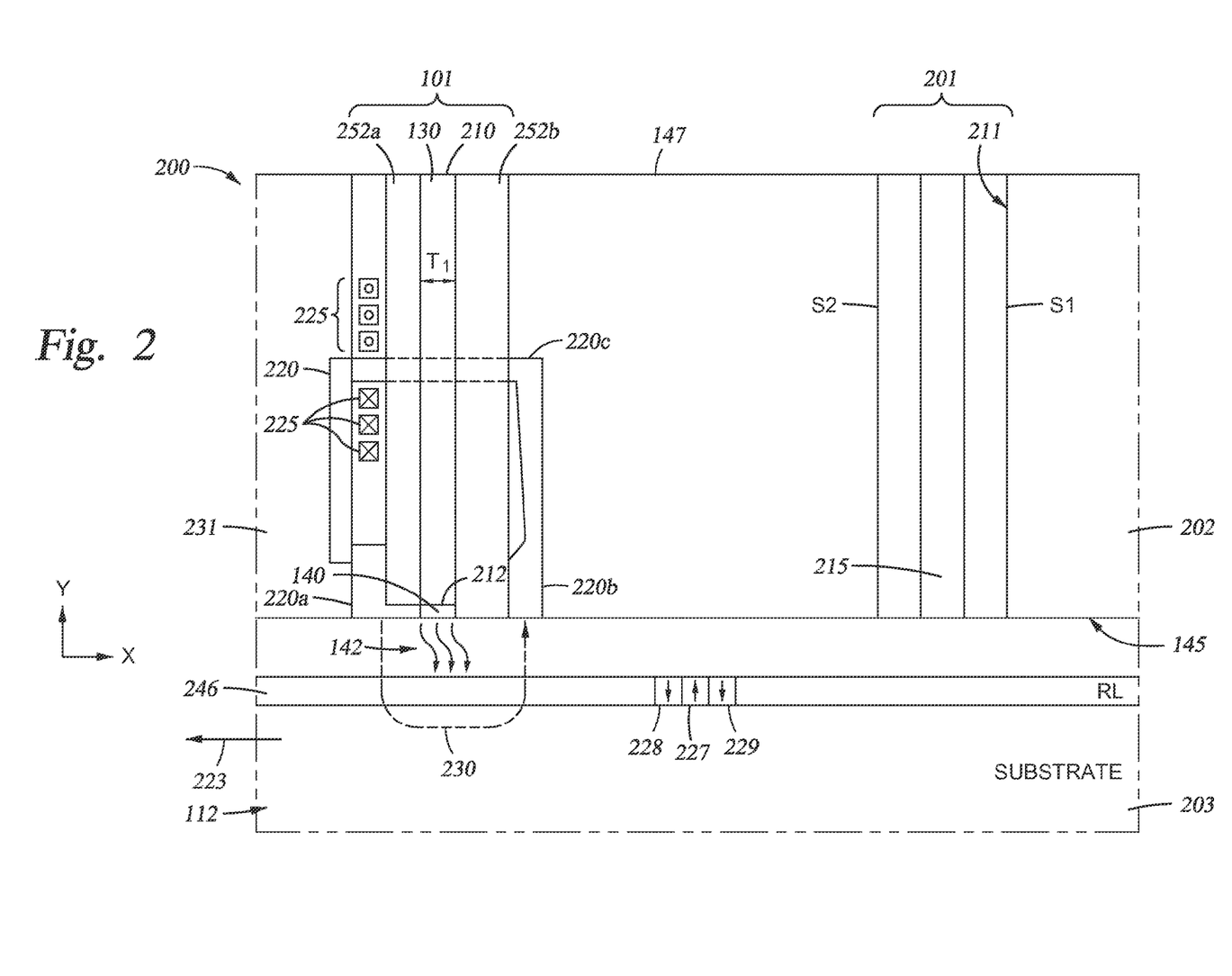
FIG. 2 illustrates a cross-sectional schematic diagram of a HAMR-enabled disk drive, according to one embodiment disclosed herein.

FIG. 2 illustrates a cross-sectional schematic diagram of a HAMR-enabled disk drive, according to one embodiment disclosed herein. Specifically, FIG. 2 illustrates a portion of a read/write head 200 and associated perpendicular magnetic media 112 for a HAMR disk drive that uses a SSC 130 for directing optical power from a radiation source, e.g., a laser diode, to the NFT 140. The media 112 includes a disk substrate 203 and a perpendicular magnetic recording layer (RL) 246. In one embodiment, the media 112 may include an optional "soft" or relatively low-coercivity magnetically permeable underlayer (SUL). However, the SUL is not required for a HAMR disk drive 100.

The RL 246 may be any media with perpendicular magnetic anisotropy, such as a granular layer of CoCr alloy grown on a special growth-enhancing sublayer, or a multilayer of alternating films of Co with films of Pt or Pd. The RL 246 may also be an $L1_0$ ordered alloy such as FePt or FeNiPt. The media 112 may also include a protective overcoat (not shown) over the RL 246.

The read/write head 200 is formed on a substrate 202 and has a substrate-trailing surface 211. The MFS 145 may generally be oriented perpendicular to the trailing surface 211. The substrate 202 is typically formed of a composite material, such as $Al_2O_3$ or TiC, and supports the read and write elements, which are typically formed as a series of thin films and structures on the trailing surface 211. The media 112 may spin in a direction 223 away from the trailing surface 211 and towards the other layers of the read/write head 200. Note that FIG. 2 is not drawn to scale because of the difficulty in showing the very small features and, for the sake of clarity, omits certain structures from the head such as spacings and insulating layers.

The head/write head 200 includes a read head 201 that includes a magnetoresistive read pole 215 located between shields S1 and S2. The read/write head 200 also includes the write head 101 that includes a magnetic yoke 220 with a write pole 220a and a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. The magnetic flux 230 continues through the substrate, or a SUL layer, before arriving at the return pole 220b. However, the disclosure is not limited to the structure and material discussed above. For example, the coil 225 may be a helical coil or the write pole 220a may include a wrap-around shield. Furthermore, the embodiments disclosed herein may operate with any recording head that can perform the functions discussed herein.

The write head 101 may also include the SSC 130 and the NFT 140 near or at the MFS 145. As shown, the SSC 130 extends through the yoke 220 and is located between the write pole 220a and the return pole 220b. As noted by the dashed lines, the yoke 220 may continuously connect the write pole 220a to the return pole 220b with a magnetic member 220c. The SSC 130 and NFT 140 may be fabricated at any location such that the NFT 140 passes over a portion of the spinning magnetic media 112 prior to that portion passing below the write pole 220a. Specifically, the SSC 130 may also be located between shield S2 and return pole 220b, or between the write pole 220a and the outer face 231 of the head 200 (if the media 112 rotates opposite to the direction 223 shown).

While writing to the media 112, the RL 246 moves relative to the head 200 in the direction shown by arrow 223, also known as the down track direction (along the negative x-axis direction in FIG. 2). In a HAMR device, the optical energy 142 emitted from the NFT 140 temporarily heats up and lowers the coercivity ($H_c$) of the RL 246 so that the magnetic recording regions 227, 228, 229 may be oriented by the write field ($H_w$) from write pole 220a. The magnetic recording regions 227, 228, 229 become oriented by the write field if $H_w$ is greater than $H_c$. After a region of the RL 246 in the data track has been exposed to $H_w$ from the write pole 220a and the region has been heated above the Curie temperature by the heat generated from the optical energy 142 emanated by the NFT 140, the region's temperature is allowed to cool and fall below the Curie temperature, at which point the data associated with the given magnetic orientation of $H_w$ is recorded onto the disk. Specifically, the transitions between recorded regions (such as previously recorded regions 227, 228, and 229) represent written data "bits" that can be read by the read pole 215. In this manner, the NFT 140 uses optical energy 142 to temporarily heat the RL 246 and lower its magnetic coercivity, thus allowing for data to be recorded onto a high-coercivity magnetic media layer.

The SSC 130 is formed of a high refractive index dielectric material that is transmissive to radiation at the wavelength of the laser radiation source—e.g., around 780 nm. Typical radiation-transmissive materials include, for example, $TiO_2$ and $Ta_2O_5$. The radiation-transmissive SSC 130 is surrounded by a cladding material 252a, 252b that has a lower refractive index than the SSC 130, such as $SiO_2$ or $Al_2O_3$. The SSC 130 may have a thickness "T1" of about 300 nm. The SSC 130 may include a first end 210 and a second end 212 that is opposite the first end 210. The first end 210 may extend to the surface 147, and the second end 212 may be disposed proximate the NFT 140. An insulating material (not shown) may be disposed between the second end 212 of the SSC 130 and the NFT 140. The first end 210 may be configured to receive the laser beam from the radiation source 155 (shown in FIG. 1B). Typically, the radiation source 155 is an edge-emitting laser diode having an asymmetric profile in the fast axis, and the laser beam from the laser diode may diverge quickly and form a large spot-size when reaching the surface 147 of the write head 101.

Figure 3:
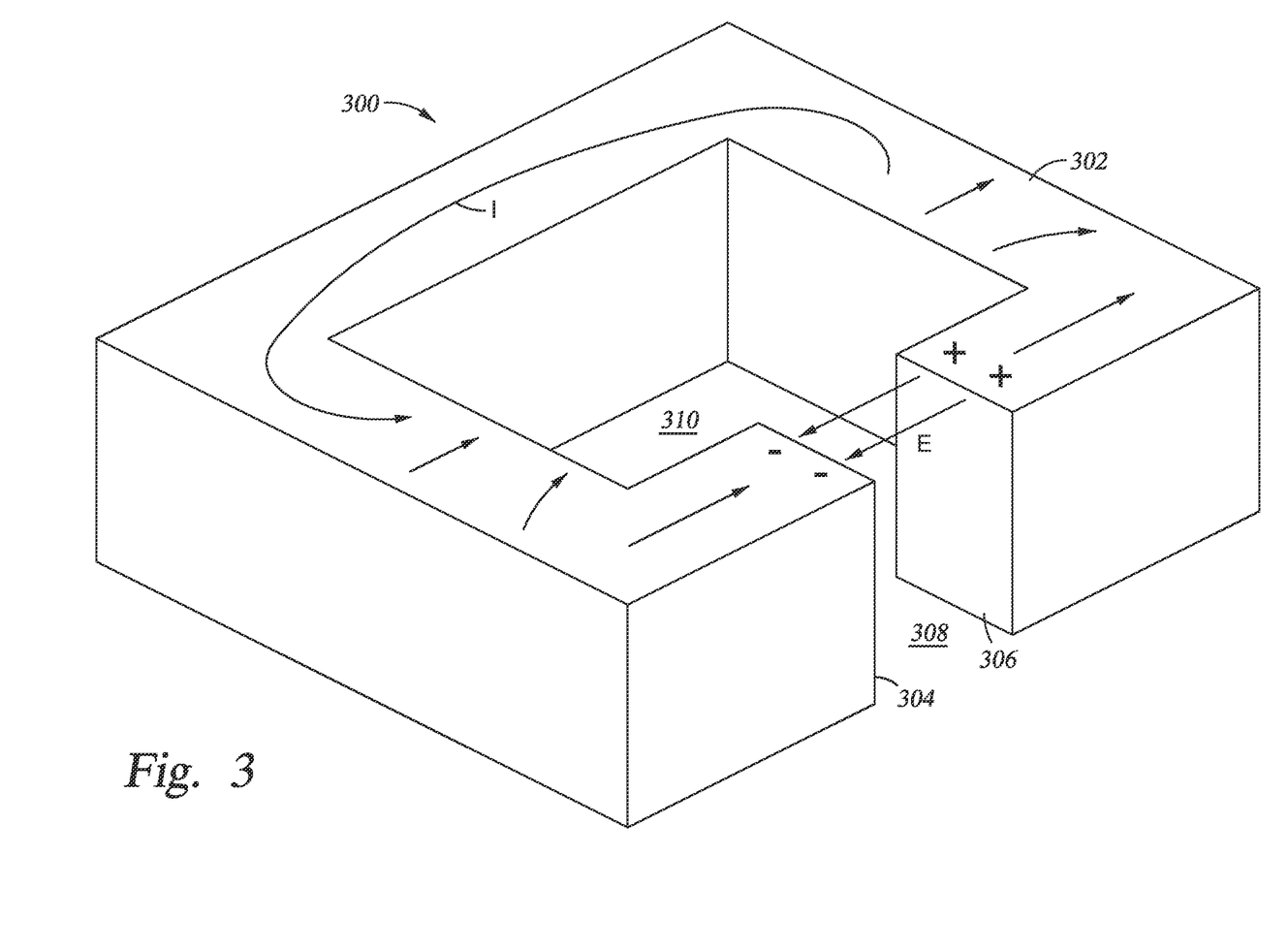
FIG. 3 is an isometric illustration of the disclosed NFT according to one embodiment.

FIG. 3 is an isometric illustration of the disclosed NFT 300 according to one embodiment. The NFT 300 is a SRR that creates a resonant circuit comprised of a body 302 having an open center area 310 and two ends 304, 306 that are spaced apart to form a gap 308. The body 302 comprises a conductive material, such as Ag or Au, and the open center area 310 and gap 308 between the ends 304, 306 are filled with a dielectric material, such as $SiO_2$. When optically driven, the gap 308 between the ends 304, 306, together with the intermediate dielectric material, will create a capacitance while the remainder of the body 302 will create an inductance. Thus, when radiation from the light source passes through the SSC and reaches the NFT 300, the free electrons of the NFT 300 will oscillate to form a resonant circuit along the body 302 and gap 308 of the NFT 300. Due to the resonant nature of the SRR circuit and the relatively small spacing between the ends 304, 306, the light interacting with the SRR will be highly concentrated and focused at the gap 308 of the NFT 300. The remainder of the body 302 will function as an inductor as well as a heat sink to thermally dissipate the heat generated by the highly concentrated light at the gap 308 as well as the oscillation of free electrons along the body 302 of the NFT 300. In the embodiment shown in FIG. 3, the body 302 has a square shape, as does the open center area 310 and gap 308, but it is to be understood that other shapes are contemplated as well.

The NFT 300 has a capacitive parallel plate (i.e., the gap 308) element coupled to an inductive metallic region, forming an optically active c-shaped metallic region that lies parallel to the recording media. The inductive element allows the SRR to have a closed-loop surface plasmon polariton (SPP) resonance, which increases its light interaction cross-section compared to an isolated parallel plate capacitive element (i.e., an NFT having no metallic connecting region). Thus, the charge distribution of the SRR SPP resonance allows for more efficient waveguide coupling for reaching the same writing conditions on the recording media. Similarly, the higher light interaction cross-section of the SRR SPP resonance leads to higher coupling efficiencies to the recording media via the near field of the parallel plate capacitor element of the SRR, leading to a reduction in temperature for both the SRR NFT and the recording magnetic pole. Furthermore, the fact that the SRR resonance is "self contained" in the c-shaped metallic region, with electric field emanating only from the capacitive gap, results in a "cleaner" thermal footprint on the recording media that has no undesired background, with a rise in temperature on the recording medium only at the region that is immediately below the capacitive part of the SRR NFT 300.

If a parallel plate type capacitive device were used as the NFT without the metal joining the back wall (i.e., no inductance), then the capacitive element would be a metal-dielectric-metal (MIM/gap) plasmonic waveguide NFT that couples the output near field of the gap to the recording media layer. However, the coupling of light to the MIM capacitive element alone is not very efficient due to the large mode mismatch between the excitation photonic mode of the SSC and the plasmonic MIM mode of the NFT, leading to higher required powers to reach the same writing conditions on the recording media as compared to the SRR NFT. A similar effect is observed on the output side of the MIM waveguide, where the MIM plasmonic mode inefficiently couples to the recording media. Furthermore, the parallel plate gap capacitor NFT also causes a large thermal background on the media due to the frustrated currents that arise in the incomplete circuit of the surface plasmons in the gap of the MIM/gap NFT. The higher writing powers and lower coupling efficiencies of the MIM/gap NFT cause it to have relatively higher head temperatures than the SRR NFT, causing the MIM NFT to be a thermally more unstable NFT design even in the presence of heavy heat sinking.

The SRR disclosed herein solves the above referenced issues. Since incident light interacts with both the metal body and the capacitive gap, the resulting SRR NFT has a larger interaction cross-section with the incident light, allowing for more efficient coupling into the SRR device and successively into the recording media, with required writing powers that are about 50 percent lower than that of the MIM NFT device. Additionally, the larger optical interaction volume of the SRR and the fact that the electric field only emanates from the capacitive gap leads to a significant increase, about 250 percent, in coupling efficiency to the media as opposed to the MIM NFT device. The effect of having a higher interaction volume with the incident light and a more efficient interaction with the recording media leads to head temperatures that are 40 to 50 percent lower for the SRR NFT and write pole as compared to the MIM NFT, leading to an SRR NFT design that is thermally more stable and reliable than the MIM NFT design.

Figure 4A:
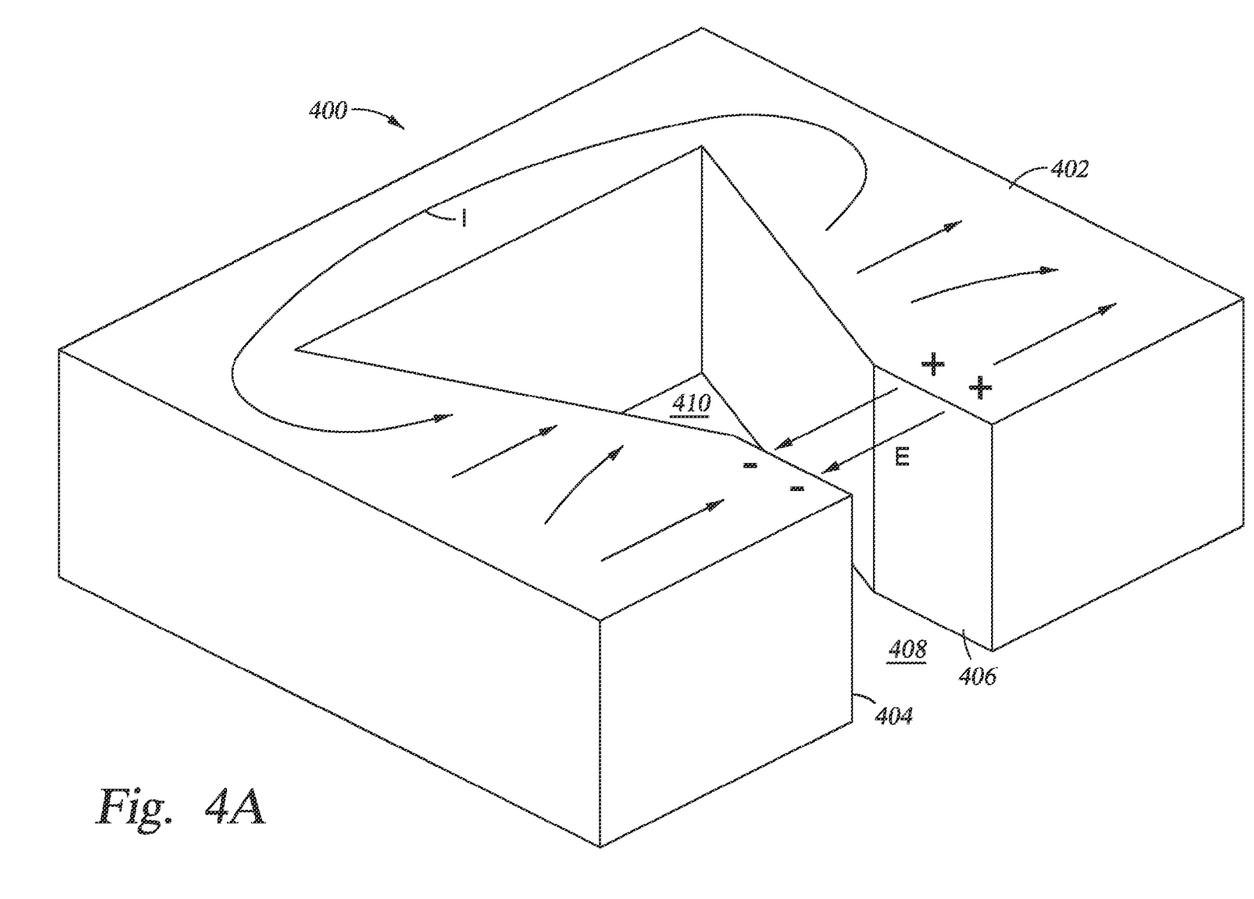
FIG. 4A is an isometric illustration of the disclosed NFT according to another embodiment.
Figure 4B:
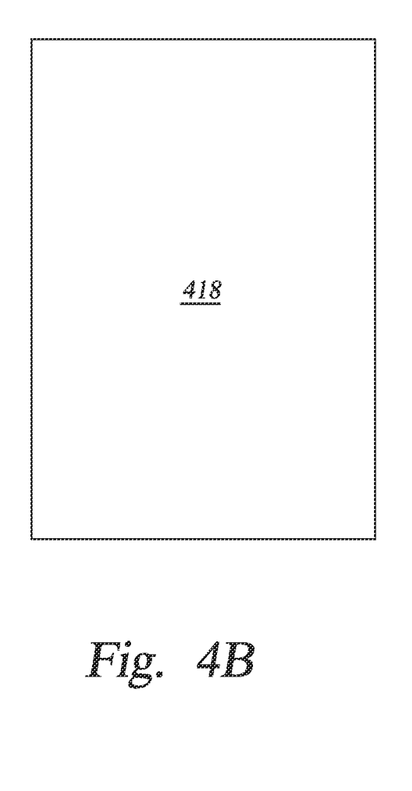
FIG. 4B is a top view of the NFT of FIG. 4A.

FIG. 4A is an isometric illustration of the disclosed NFT 400 according to another embodiment. FIG. 4B is a top view of the NFT 400 of FIG. 4A. The NFT 400 includes a rectangular shape body 402, although it is to be understood that other shapes are contemplated as well. The body 402 has an open center area 410 and two ends 404, 406 that have a gap 408 therebetween that are filled with dielectric material (not shown). In this embodiment, the center area has tapered sidewalls 412, 414 connected by a straight back wall 416. The sidewalls 412, 414 taper to the ends 404, 406 that have surfaces perpendicular to the back wall 416. As shown in FIG. 4B, the free electrons in the metal move in the NFT 400 such that they generate an electron oscillation current density that moves around the opening 410 and create a charge density accumulation at the ends 404, 406 across the gap 408. While the current goes around the opening 410, the current forms an inductance (L) in the circuit, and when the current density terminates at the ends 404, 406, the resulting charge accumulation forms a capacitance (C) across the gap 408; hence, the disclosed SRR NFT comprises a resonant LC circuit. Due to the resonant nature of the SRR circuit and the relatively small spacing between the ends 404, 406, the light is greatly focused in the gap 408 with very little of the light emanating from the remainder of the NFT 400. The light is focused onto the recording layer (246 in FIG. 2), generating a hot spot 420 that is generally contained within the dashed circle depicted in FIG. 4B. The dashed and solid line circles identify different levels of heat with the center of the hot-spot 420 having the most intense heat. Furthermore, light does not significantly expand out to the write pole 418 of the write head and hence, does not negatively impact the write head performance.

The SRR discussed above may be further improved by adding one or more inductive aperture resonators that allow for more efficient coupling of the incident light on the NFT to the recording media, leading to lower back reflections and cooler HAMR head temperatures. The inductive element of the SRR allows the NFT to have a closed-loop SPP resonance, which increases the interaction cross-section with the incident light as compared to an isolated parallel plate capacitive element NFT (i.e., an MIM/gap NFT having no connecting metal region). The charge distribution of the SRR SPP resonance alone allows for more efficient waveguide coupling relative to a similar parallel plate capacitor and only needs about 50 percent of the waveguide power to reach the same writing conditions on the media as compared to a MIM/gap NFT. The addition of the coupled aperture resonators to the SRR, which both enhance the active optical area of the NFT as well as constructively resonate with the round-trip SPP resonance of the SRR, brings the writing power down by an additional 40 percent (relative to the SRR NFT). Similarly, the efficiency of the SRR SPP resonance alone leads to 250 percent higher coupling efficiencies to the media compared to a simple parallel plate MIM/gap capacitor NFT, with the addition of the coupled aperture resonators bringing the efficiency up by another 170 percent relative to the SRR due to the constructive SPP charge oscillations that are induced in the coupled SRR-aperture system. Compared to a simple MIM/gap parallel plate capacitor NFT, the reduced writing power and increased media coupling efficiency of the SRR NFT lead to a 40 percent reduction in head temperature accompanied by a 50 percent temperature reduction for the recording magnetic pole. The addition of the coupled resonators brings these temperature values down by an additional 6 and 7 percent (relative to the SRR) for the head and pole, respectively.

The inductive apertures positioned on either side of the SRR improve the coupling efficiency to the media. Each aperture resonator supports a round-trip SPP resonance, and when placed in the vicinity of the SRR, the resonance of the aperture resonators can be set to constructively interfere with that of the SRR, allowing for 170 percent higher coupling efficiency into the media relative to the SRR alone, with absolute coupling efficiencies in the 6 percent range. The enhancement in coupling efficiency results in a 40 percent reduction in the required power for reaching the same writing conditions on the recording media relative to the SRR NFT alone. The reduction in writing power and enhancement in coupling efficiency together lead to an additional 6 and 7 percent reduction in temperature in the NFT and pole, respectively, resulting in the net effect of both coupling more light into the coupled SRR-aperture system, but at the cost of driving more current in the NFT. The net effect is to drop the head temperatures, allowing for a thermally and optically more stable HAMR NFT design. Note also that, although placing the apertures near the SRR increases the area of the delivery waveguide that is exposed to the media, the media still only senses the near field of the SRR gap, thus leaving the thermal footprint the same as for the single SRR, except that the thermal footprint may be achieved with less optical power.

Figure 5A:
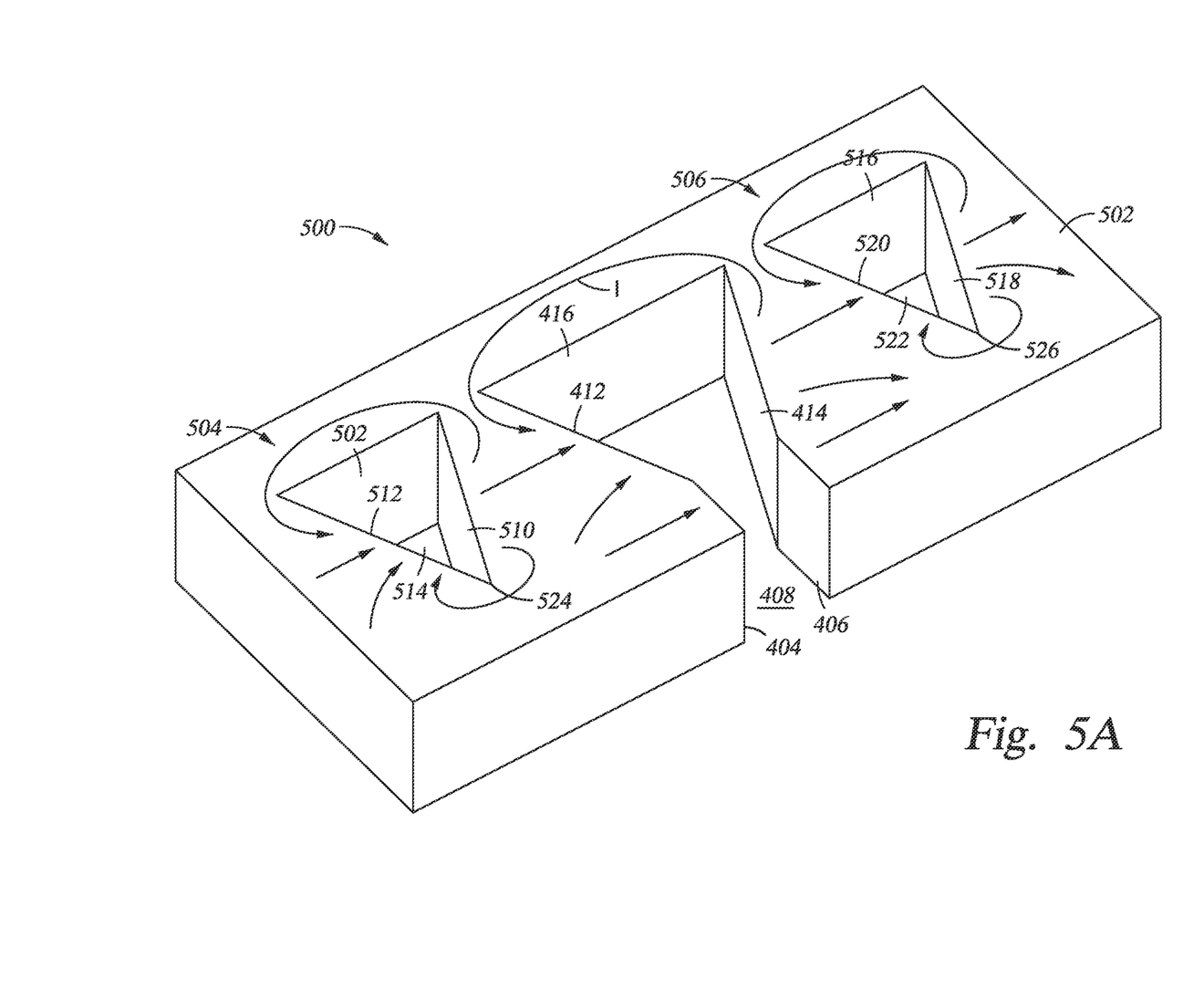
FIG. 5A is an isometric illustration of the disclosed NFT according to another embodiment.
Figure 5B:
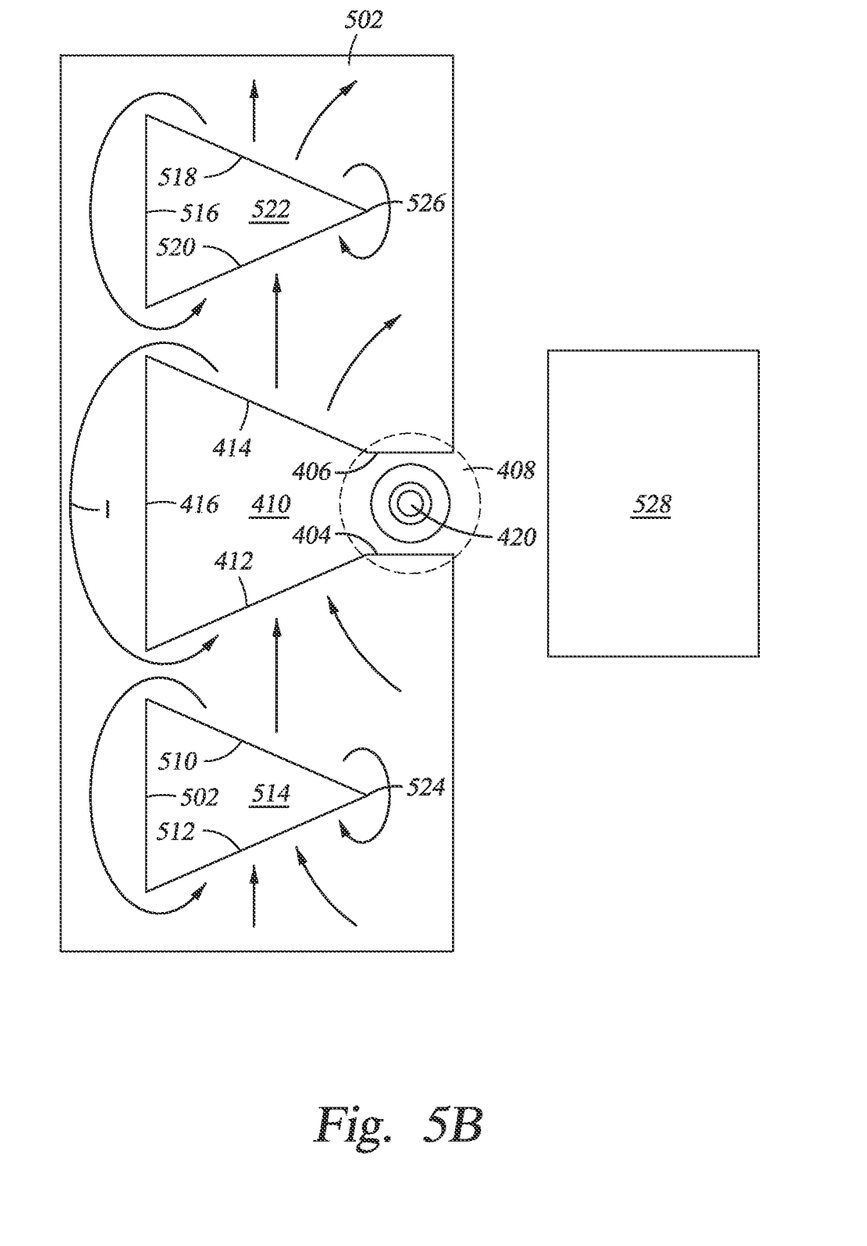
FIG. 5B is a top view of the NFT of FIG. 5A.

FIG. 5A is an isometric illustration of an NFT 500 according to another embodiment. FIG. 5B is a top view of the NFT 500 of FIG. 5A. The NFT 500 includes not only the SRR discussed above with regards to FIGS. 4A and 4B, but also the added inductive apertures 504, 506. The apertures include back walls 502, 516 and tapering sidewalls 510, 512, 518, 520. The tapering sidewalls 510, 512, 518, 520 extend from the back walls 502, 516 and meet at a point 524, 526. Furthermore, each aperture 504, 506 has an opening 514, 522 that is filled with dielectric material (not shown). Due to the round-trip SPP path-length supported by the apertures 504, 506, it is understood that they have a predominantly inductive coupling effect on the SRR circuit. As shown in FIG. 5B, the NFT 500 has a very well concentrated ultra-small focused light spot 420 that does not extend very much into the write pole 528. In the embodiment shown in FIGS. 5A and 5B, the apertures 504, 506 have a triangular shape, but it is to be understood that other shapes are contemplated as well.

The NFTs disclosed herein are beneficial because the NFTs contain a SRR that has a resonance that is self-contained. The electric field emanates only from the gap of the SRR (i.e., the capacitance location). The SRR has a larger heat sink over MIM parallel plate NFTs and a very tightly focused light spot that does not interfere with the write pole. In other words, there is a hot-spot on the media only at the location corresponding to the gap portion of the SRR NFT. Due to the focused hot-spot, less optical power is needed to achieve the required writing conditions to the media as compared to a MIM parallel plate NFT. Furthermore, aperture resonators may be used in addition to the SRR to further reduce the head temperatures during operation.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording system, comprising:
   a magnetic medium; and
   a magnetic write head having a near field transducer, the near field transducer comprising a body having an aperture therethrough, a first end, and a second end, wherein the first end is spaced from the second end to form a capacitance portion, and wherein the body between the two ends forms an inductance portion.

2. The magnetic recording system of claim 1, wherein the body has a first side wall, a second side wall, and a back wall, wherein the first side wall extends between the back wall and the first end, wherein the second side wall extends between the back wall and the second end.

3. The magnetic recording system of claim 2, wherein the first side wall and the second sidewall are tapered from the back wall to the first and second ends.

4. The magnetic recording system of claim 3, wherein the first end and second end are perpendicular to the back wall.

5. The magnetic recording system of claim 1, wherein the body further comprises one or more aperture resonators.

6. The magnetic recording system of claim 5, wherein the one or more aperture resonators comprises two aperture resonators.

7. A hard disk drive, comprising:
   one or more disks coupled to a spindle;
   a slider disposed opposite the one or more disks;
   a magnetic write head coupled to the slider, the magnetic write head including a near field transducer that comprises a body having an aperture therethrough, a first end, and a second end, wherein the first end is spaced from the second end to form a capacitance portion, and wherein the body between the two ends forms an inductance portion.

8. The hard disk drive of claim 7, wherein the body has a first side wall, a second side wall, and a back wall, wherein the first side wall extends between the back wall and the first end, wherein the second side wall extends between the back wall and the second end.

9. The hard disk drive of claim 8, wherein the first side wall and the second sidewall are tapered from the back wall to the first and second ends.

10. The hard disk drive of claim 9, wherein the first end and second end are perpendicular to the back wall.

11. The hard disk drive of claim 10, wherein the body further comprises one or more aperture resonators.

* * * * *

UNITED STATES PATENT AND TRADEMARK OFFICE
CERTIFICATE OF CORRECTION

| | |
|---|---|
| PATENT NO. | : 9,202,494 B1 |
| APPLICATION NO. | : 14/706686 |
| DATED | : December 1, 2015 |
| INVENTOR(S) | : Burgos et al. |

It is certified that error appears in the above-identified patent and that said Letters Patent is hereby corrected as shown below:

On the title page item [73],

Delete "HGST Netherland B.V." and insert --HGST Netherlands B.V.-- therefor.

Signed and Sealed this
Twenty-ninth Day of March, 2016

Michelle K. Lee
*Director of the United States Patent and Trademark Office*